United States Patent
Zhang

(10) Patent No.: US 8,665,827 B2
(45) Date of Patent: Mar. 4, 2014

(54) METHOD AND SYSTEM FOR MOBILE STATION HANDOVER, AND MOBILE STATION

(75) Inventor: Wei Zhang, Shenzhen (CN)

(73) Assignee: Huawei Device Co., Ltd., Shenzhen, P.R. (CN)

( * ) Notice: Subject to any disclaimer, the term of this patent is extended or adjusted under 35 U.S.C. 154(b) by 369 days.

(21) Appl. No.: 13/040,680

(22) Filed: Mar. 4, 2011

(65) Prior Publication Data

US 2011/0149911 A1 Jun. 23, 2011

Related U.S. Application Data

(63) Continuation of application No. PCT/CN2009/073682, filed on Sep. 2, 2009.

(30) Foreign Application Priority Data

Sep. 5, 2008 (CN) .......................... 2008 1 0216058

(51) Int. Cl.
*H04B 7/005* (2006.01)
*H04L 12/28* (2006.01)
(52) U.S. Cl.
USPC ......... 370/331; 370/278; 370/395.2; 370/401
(58) Field of Classification Search
USPC ....................................................... 370/331
See application file for complete search history.

(56) References Cited

U.S. PATENT DOCUMENTS

| | | | |
|---|---|---|---|
| 7,145,890 B1 | 12/2006 | Seo et al. | |
| 2004/0176094 A1 | 9/2004 | Kim et al. | |
| 2005/0048978 A1 | 3/2005 | Santhoff et al. | |
| 2006/0116118 A1 | 6/2006 | Charriere et al. | |
| 2006/0172738 A1* | 8/2006 | Kwon et al. | 455/439 |
| 2007/0010251 A1 | 1/2007 | Cho et al. | |
| 2007/0218908 A1* | 9/2007 | Kang et al. | 455/442 |
| 2007/0238464 A1 | 10/2007 | Lim et al. | |
| 2007/0259692 A1* | 11/2007 | Venkatachalam | 455/560 |

(Continued)

FOREIGN PATENT DOCUMENTS

| | | |
|---|---|---|
| CN | 1504053 A | 6/2004 |
| CN | 1757183 A | 4/2006 |

(Continued)

OTHER PUBLICATIONS

Extended European Search Report, Applicant: Huawei Device Co., Ltd., 09815591.4-2412/2323439 PCT/CN2009073682, Dec. 29, 2011, 12 pages.

(Continued)

*Primary Examiner* — Faruk Hamza
*Assistant Examiner* — Abu-Sayeed Haque
(74) *Attorney, Agent, or Firm* — Slater & Matsil, L.L.P.

(57) ABSTRACT

In a method embodiment, the current serving BS of the MS obtains information about neighboring BSs, and broadcasts the information about the neighboring BSs. The MS scans the neighboring BSs according to the neighboring BS information broadcast by the current serving BS. If no neighboring BS having the same bandwidth as the current serving BS fulfills requirements, the MS scans and measures signal quality of neighboring BSs with a different bandwidth and selects several BSs compliant with signal quality requirements and suitable as target BSs to make up a target BS list. The MS performs handover to a target BS in the target BS list.

13 Claims, 2 Drawing Sheets

(56) References Cited

U.S. PATENT DOCUMENTS

| | | | |
|---|---|---|---|
| 2009/0215460 A1 | 8/2009 | Hasegawa | |
| 2009/0290555 A1* | 11/2009 | Alpert et al. | 370/331 |
| 2011/0134886 A1* | 6/2011 | Kim et al. | 370/331 |
| 2011/0149911 A1 | 6/2011 | Zhang | |
| 2011/0281581 A1* | 11/2011 | Brandt et al. | 455/427 |
| 2012/0020329 A1* | 1/2012 | Lee et al. | 370/331 |

FOREIGN PATENT DOCUMENTS

| | | |
|---|---|---|
| CN | 101360343 A | 2/2009 |
| EP | 1 657 948 A1 | 5/2006 |
| EP | 2 081 391 A1 | 7/2009 |
| JP | 11-41660 A | 2/1999 |
| WO | WO 02/49378 A1 | 6/2002 |
| WO | WO 2010/034222 A1 | 4/2010 |

OTHER PUBLICATIONS

NTT DoCoMo, "Cell Search Method in Connected and Idle Mode for E-UTRA Downlink," 3GPP TSG-RAN WG1 LTE Ad Hoc Meeting, Document for Discussion and Decision, R1-060163, Jan. 23-25, 2006, Helsinki, Finland, 3 pages.

Lindoff, et al., "On Selectivity Filter Design for 3G Long-Term Evolution Mobile Terminals," Jun. 2007, Ericsson Research, Nya Vattentornet, SE-223 83, Lund, Sweden, 5 pages.

Written Opinion of the International Searching Authority, International Application No. PCT/CN2009/073682, Applicant: Shenzhen Huawei Communication Technologies Co., Ltd., et al., Dated: Dec. 17, 2009, 4 pages.

* cited by examiner

METHOD AND SYSTEM FOR MOBILE STATION HANDOVER, AND MOBILE STATION

This application is a continuation of co-pending International Application No. PCT/CN2009/073682, filed on Sep. 2, 2009, which designated the United States and which claims priority to Chinese Patent Application No. 200810216058.4, filed on Sep. 5, 2008, both of which are hereby incorporated by reference in their entireties.

TECHNICAL FIELD

The present invention relates to communication technologies, and in particular, to a method and system for mobile station (MS) handover, and a mobile station.

BACKGROUND

Handover of an MS is a process of migrating the MS from an air interface provided by a Base Station (BS) to an air interface provided by another BS. When signal attenuation or interference occurs, the MS needs to reselect a BS to obtain better signal quality or Quality of Service (QoS) through handover. Currently, commercial MSs generally support handover between BSs that have the same bandwidth only. In the process of implementing the present invention, the inventor finds that, if the MS expects to be handed over to a BS whose bandwidth is different from the bandwidth of the current serving BS, and use the air interface service provided by the BS that has a different bandwidth, the MS has to be restarted to adjust the bandwidth and access the network again, which makes service interruption inevitable. As a result of spectrum division and allocation, one operator usually deploys networks by using BSs with different bandwidths; or, in the case of roaming, the MS runs across BSs with different bandwidths. In such cases, the MS needs to be handed over between BSs with different bandwidths, which generally causes service interruption.

SUMMARY OF THE INVENTION

The embodiments of the present invention provide a method and system for MS handover, and an MS so that an MS can be handed over between BSs with different bandwidths.

A method for MS handover in an embodiment of the present invention includes a current serving BS of an MS obtaining information about neighboring BSs and broadcasting the information about the neighboring BSs. The MS scans the neighboring BSs according to the neighboring BS information broadcast by the current serving BS. If no neighboring BS having the same bandwidth as the current serving BS fulfills requirements, signal quality of neighboring BSs with a different bandwidth is scanned and measured, and several BSs compliant with signal quality requirements and suitable as target BSs are selected to make up a target BS list. The MS performs handover to a target BS in the target BS list.

A system for MS handover includes a current serving BS that is adapted to obtain information about neighboring BSs, and broadcast the information about the neighboring BSs. An MS is adapted to scan the neighboring BSs according to the neighboring BS information broadcast by the current serving BS. If no neighboring BS having the same bandwidth as the current serving BS fulfills requirements, the MS scans and measures signal quality of neighboring BSs with a different bandwidth, and selects several BSs compliant with signal quality requirements and suitable as target BSs to make up a target BS list. A handover is performed to a target BS in the target BS list.

An MS includes a scanning module that is adapted to scan neighboring BSs according to neighboring BS information broadcast by a current serving BS. A first processing module is adapted to adjust physical layer parameters for handover to the channel bandwidth of the scanned BSs within a scan interval if no neighboring BS having the same bandwidth as the current serving BS fulfills requirements, to reserve Media Access Control (MAC) layer information and other upper-layer information, and to buffer current service flow data. A selecting module is adapted to scan and measure signal quality of neighboring BSs with a different bandwidth, and to select several BSs compliant with signal quality requirements and suitable as target BSs to make up a target BS list. A handover module is adapted to perform handover to a target BS in the target BS list.

Through the technical solution under the present invention, the MS is handed over between BSs with different bandwidths, with little or no time of service interruption.

DETAILED DESCRIPTION OF ILLUSTRATIVE EMBODIMENTS

The technical solution under the present invention is described below with reference to accompanying drawings.

Figure 1:
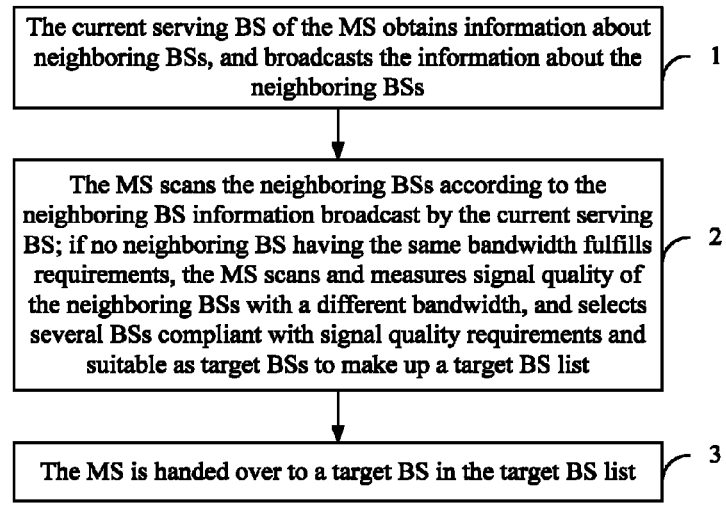
FIG. 1 is a flowchart of a method according to an embodiment of the present invention.

As shown in FIG. 1, a method for MS handover in an embodiment of the present invention includes the following steps.

Step 1: A current serving BS of the MS obtains information about neighboring BSs, and broadcasts the information about the neighboring BSs.

When the BSs with different bandwidths are applied to networking, the information about these BSs is generally configured on the network-side gateway. The current serving BS of the MS can obtain the information about the BSs adjacent to the current serving BS from the gateway. The information may include physical layer parameters such as the channel bandwidth of the neighboring BSs, and Fast Fourier Transform (FFT) quantity. Besides, the serving BS may use an air interface message MOB_NBR-ADV to broadcast the information about the neighboring BSs on the air interface.

Step 2: The MS scans the neighboring BSs according to the neighboring BS information broadcast by the current serving BS. If no neighboring BS having the same bandwidth fulfills requirements, the MS scans and measures signal quality of the neighboring BSs with a different bandwidth, and selects several BSs compliant with signal quality requirements and suitable as target BSs to make up a target BS list.

The method for scanning and measuring the signal quality of the neighboring BSs with a different bandwidth may be as follows. The MS adjusts physical layer parameters for handover to the channel bandwidth of the scanned BSs within a scan interval, reserves MAC layer information and other upper-layer information, buffers current service flow data, and then scans and measures the signal quality of the neighboring BSs with a different bandwidth.

After completion of scanning, the MS readjusts the physical layer parameters to recover communications with the current serving BS.

The process of adjusting the physical layer parameters dynamically and reserving the MAC layer information and other upper-layer information to scan the neighboring BSs with a different bandwidth and the process of readjusting the physical layer parameters to recover communications with the current serving BS may occur repeatedly. In such processes, although the physical layer parameters are adjusted dynamically, the upper-layer information such as MAC layer information and service data can be stored, thus avoiding loss of information after handover of the MS.

Generally, because the process of handover between BSs with the same bandwidth is simple, the MS selects a neighboring BS with the same bandwidth for handover first. If no neighboring BS with the same bandwidth fulfills the requirements, the MS selects a neighboring BS with a different bandwidth for handover. "No neighboring BS with the same bandwidth fulfills the requirements" means that the signal quality of no neighboring BS with the same bandwidth fulfills the requirements, or all neighboring BSs have a different bandwidth from the current serving BS, or no neighboring BS with the same bandwidth allows handover.

Step 3: The MS is handed over to a target BS in the target BS list.

Figure 2:
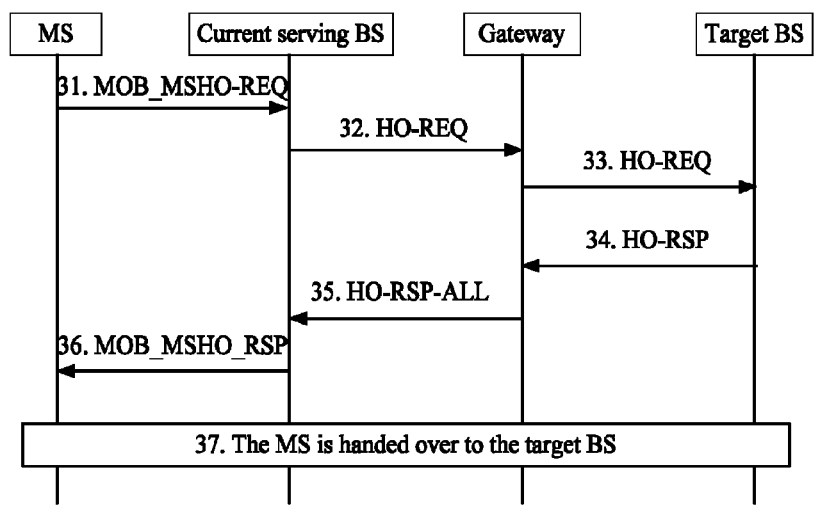
FIG. 2 shows how an MS is handed over to a target BS in a target BS list according to an embodiment of the present invention.

As shown in FIG. 2, the MS may be handed over to a target BS in the target BS list through the following steps:

Step 31: When the MS needs to be handed over, the MS sends a MOB_MSHO-REQ message to the current serving BS. The MOB_MSHO-REQ message carries the target BS list information.

Because the bandwidth of the target BSs in this target BS list is different from the bandwidth of the MS and the bandwidth of the current serving BS of the MS, the bandwidth changes in the handover process of the MS, and the relevant parameters in the SS basic capability request (SBC-REQ) and registration request (REG-REQ) may change accordingly in the handover process. When the relevant parameters in the SBC-REQ and the REG-REQ change, the MOB_MSHO-REQ message may further carry the SBC context and the REG context under the channel bandwidth after handover of the MS. However, to save the bandwidth, the SBC-REQ and the REG-REQ in the MOB_MSHO-REQ message may carry only the items which are different from those in the SBC-REQ and the REG-REQ reported under the old bandwidth. Besides, the Tag Length Value (TLV) of the BC-REQ message and the REG-REQ message in the MOB_MSHO-REQ message may be defined.

Step 32: After receiving the MOB_MSHO-REQ message, the current serving BS of the MS parses the MOB_MSHO-REQ message to obtain and store the SBC-REQ message and the REG-REQ message, and sends a HO-REQ message to the network-side gateway. The HO-REQ message carries the target BS list and an MS context. If the MS adds the result of scanning and measuring the target BSs in the target BS list to the MOB_MSHO-REQ message and sends the message to the current serving BS of the MS, the HO-REQ message further carries the result of scanning and measuring the target BSs in the target BS list optionally. The MS context includes the service flow information, SBC context, REG context, and security context. Some of the relevant parameters in the SBC context and the REG context are the relevant parameters in the SBC-REQ and the REG-REQ carried in the MOB_M-SHO-REQ message, namely, parameters in the SBC-REQ and the REG-REQ of the MS under the bandwidth after handover. The security context does not necessarily include an Authorization Key (AK) context.

Step 33: After receiving the HO-REQ message, the network-side gateway distributes the HO-REQ message to all target BSs in the target BS list. Alternatively, after receiving the HO-REQ message, the network-side gateway selects several target BSs in the target BS list according to the load conditions of each target BS, and uses them to make up a second target BS list. The network-side gateway adds the second target BS list to the HO-REQ message, and distributes the message to all target BSs in the second target BS list. Alternatively, after receiving the HO-REQ message, the network-side gateway selects several target BSs in the target BS list according to the load conditions of each target BS, and uses them to make up a second target BS list; and calculates a new AK context of the MS, adds the second target BS list and the new AK context to the HO-REQ message, and distributes the message to all target BSs in the second target BS list.

Step 34: The target BS that receives the HO-REQ message returns a HO-RSP message to the network-side gateway. The HO-RSP message carries a handover-allowed flag indicating whether the handover is allowed, which is determined by the target BS after the target BS manages the network re-access resources of the target BS. The HO-RSP message optionally carries a handover optimization indication. The handover optimization indication is determined by the target BS preliminarily according to the MS context in the HO-REQ message. It indicates the steps omissible when the MS is handed over to the target BS.

Step 35: After receiving the HO-RSP message replied by each target BS, the network-side gateway sends a HO-RSP-ALL message to the current serving BS of the MS. The HO-RSP-ALL message sent by the gateway to the current serving BS carries the HO-RSP message replied by all target BSs that respond successfully.

Step 36: After receiving the HO-RSP-ALL message, the current serving BS of the MS sends an air interface message MOB_BSHO-RSP to the MS. The MOB_BSHO-RSP message carries the HO-RSP message replied by all target BSs that respond successfully in the HO-RSP-ALL message.

Step 37: After receiving the MOB_BSHO-RSP message, the MS selects a target BS for handover from a target BS list in this MOB_BSHO-RSP message or from a second target BS list.

Figure 3:
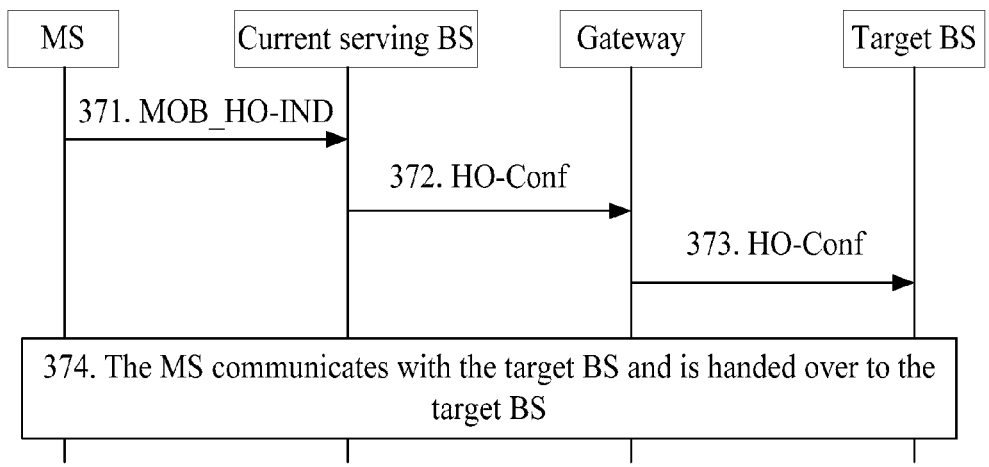
FIG. 3 shows how an MS selects a target BS for handover from a target BS list carried in a MOB_BSHO-RSP message or from a second target BS list according to an embodiment of the present invention.

As shown in FIG. 3, the process of the MS selecting a target BS for handover from a target BS list in the MOB_BSHO-RSP message or from a second target BS list includes the following steps.

Step 371: The MS sends a MOB_HO-IND message to the current serving BS of the MS, indicating the target BS for handover; adjusts the physical layer parameters; and reserves the MAC layer information and other upper-layer information for handover to the channel bandwidth of the target BS so as to communicate with the target BS.

Step 372: After receiving the MOB_HO-IND message, the current serving BS of the MS sends a HO-Confirm message to the network-side gateway. The HO-Confirm message carries an identifier (ID) of the target BS and the MS context. The MS context includes the service flow information, SBC context, REG context, and security context. Some of the relevant parameters in the SBC context and the REG context are the relevant parameters in the SBC-REQ and the REG-REQ carried in the MOB_MSHO-REQ message, namely, parameters in the SBC-REQ and the REG-REQ of the MS under the bandwidth after handover. The security context does not necessarily include an AK context.

Step 373: The network-side gateway forwards the HO-Confirm message to the MS, indicating the target BS for handover.

Step 374: After receiving the HO-Confirm message, the target BS indicated by the MS communicates with the MS according to the HO-Confirm message, and the MS is handed over to the target BS.

As mentioned in step 31, when the relevant parameters in the SBC-REQ and the REG-REQ change, the MOB_MSHO-REQ message may further carry the SBC context and the REG context of the MS under the channel bandwidth after handover.

In a method provided in another embodiment, the MOB_MSHO-REQ message carries no SBC context or REG context of the MS under the channel bandwidth after handover. In this embodiment, the MS may be handed over to a target BS in the target BS list through the following steps.

Step 401: When the MS needs to be handed over, the MS sends a MOB_MSHO-REQ message to the current serving BS. The MOB_MSHO-REQ message carries the target BS list information.

Step 402: After receiving the MOB_MSHO-REQ message, the current serving BS of the MS sends a HO-REQ message to the network-side gateway. The HO-REQ message carries the target BS list, an MS context, and a physical layer parameter Information Element (IE). The physical layer parameter IE indicates a bandwidth difference between the current serving BS of the MS and the target BS. The MS context in this embodiment includes the service flow information, SBC context, REG context, and security context. Some of the relevant parameters in the SBC context and the REG context are the relevant parameters in the SBC-REQ and the REG-REQ of the MS under the bandwidth before handover.

Step 403: After receiving the HO-REQ message, the network-side gateway distributes the HO-REQ message to all target BSs in the target BS list. Alternatively, after receiving the HO-REQ message, the network-side gateway selects several target BSs in the target BS list according to the load conditions of each target BS, and uses them to make up a second target BS list. The network-side gateway adds the second target BS list to the HO-REQ message, and distributes the message to all target BSs in the second target BS list. Alternatively, after receiving the HO-REQ message, the network-side gateway selects several target BSs in the target BS list according to the load conditions of each target BS, and uses them to make up a second target BS list; and calculates a new AK context of the MS, adds the second target BS list and the new AK context to the HO-REQ message, and distributes the message to all target BSs in the second target BS list.

Step 404: The target BS that receives the HO-REQ message returns a HO-RSP message to the network-side gateway. The HO-RSP message carries a handover-allowed flag indicating whether the handover is allowed, which is determined by the target BS after the target BS manages the network re-access resources of the target BS. The HO-RSP message optionally carries a handover optimization indication. The handover optimization indication is determined by the target BS preliminarily according to the MS context in the HO-REQ message. It indicates the steps omissible when the MS is handed over to the target BS. In this embodiment, however, the handover optimization indication includes an indication that the SBC context and the REG context are not omissible.

Step 405: After receiving the HO-RSP message replied by each target BS, the network-side gateway sends a HO-RSP-ALL message to the current serving BS of the MS. The HO-RSP-ALL message sent by the gateway to the current serving BS carries the HO-RSP message replied by all target BSs that respond successfully.

Step 406: After receiving the HO-RSP-ALL message, the current serving BS of the MS sends an air interface message MOB_BSHO-RSP to the MS. The MOB_BSHO-RSP message carries the HO-RSP message replied by all target BSs that respond successfully in the HO-RSP-ALL message.

Step 407: After receiving the MOB_BSHO-RSP message, the MS selects a target BS for handover from a target BS list in the MOB_BSHO-RSP message or from a second target BS list.

The process of the MS selecting a target BS for handover from a target BS list in the MOB_BSHO-RSP message or from a second target BS list includes the following steps:

Step 4071: The MS sends a MOB_HO-IND message to the current serving BS of the MS, indicating the target BS for handover; adjusts the physical layer parameters; and reserves the MAC layer information and other upper-layer information for handover to the channel bandwidth of the target BS so as to communicate with the target BS.

Step 4072: After receiving the MOB_HO-IND message, the current serving BS of the MS sends a HO-Confirm message to the network-side gateway. The HO-Confirm message carries the target BS list, an MS context, and a physical layer parameter IE. The physical layer parameter IE indicates a bandwidth difference between the current serving BS of the MS and the target BS. The MS context in this embodiment includes the service flow information, SBC context, REG context, and security context. Some of the relevant parameters in the SBC context and the REG context are the relevant parameters in the SBC-REQ and the REG-REQ of the MS under the bandwidth before handover.

Step 4073: The network-side gateway forwards the HO-Confirm message to the MS, indicating the target BS for handover.

Step 4074: After receiving the HO-Confirm message, the target BS indicated by the MS communicates with the MS according to the HO-Confirm message, and the MS is handed over to the target BS. In the process of communications with the MS, the target BS instructs the MS to perform SBC negotiation and REG negotiation again. According to the instruction of the target BS, the MS reports the SBC context and the REG context of the MS under the bandwidth after handover. However, to save the bandwidth, the SBC-REQ and the REG-REQ in the MOB_MSHO-REQ message may carry only the items which are different from those in the SBC-REQ and the REG-REQ reported under the old bandwidth.

This embodiment is applicable to the wireless broadband access technologies of the networks such as Worldwide Interoperability for Microwave Access (WiMAX) and Long Term Evolution (LTE), in which the physical layer applies the Scalable Orthogonal Frequency Division Multiple Access (SOFDMA)

Figure 4:
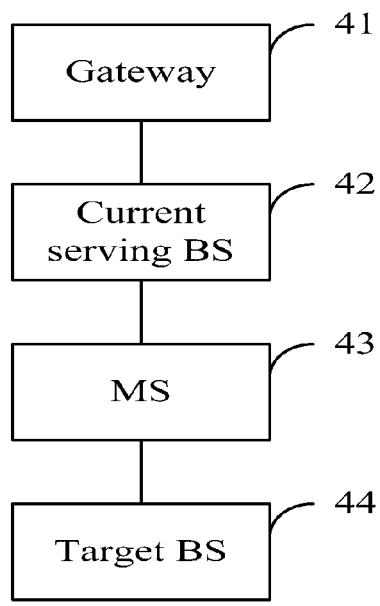
FIG. 4 shows a structure of a system according to an embodiment of the present invention.

A system for MS handover is provided in an embodiment of the present invention. As shown in FIG. 4, the system includes a gateway 41, a current serving BS 42, an MS 43, and a target BS 44.

The current serving BS 42 is adapted to obtain information about neighboring BSs from the gateway 41, and broadcast the information about the neighboring BSs. The information may include physical layer parameters such as the channel bandwidth of the neighboring BSs, and FFT quantity. The current serving BS may include: an obtaining module, adapted to obtain the information about the neighboring BSs from the gateway; and a broadcasting module, adapted to broadcast the information about the neighboring BSs on an air interface by using an air interface message MOB_NBR-ADV.

The MS 43 is adapted to scan the neighboring BSs according to the neighboring BS information broadcast by the current serving BS 42. If no neighboring BS having the same bandwidth as the current serving BS fulfills requirements, scan and measure signal quality of neighboring BSs with a different bandwidth, and select several BSs compliant with signal quality requirements and suitable as target BSs to make up a target BS list; and perform handover to the target BS 44 in the target BS list.

The MS 43 includes a scanning module, adapted to scan neighboring BSs according to neighboring BS information broadcast by a current serving BS; a first processing module, adapted to: adjust physical layer parameters for handover to the channel bandwidth of the scanned BSs within a scan interval if no neighboring BS having the same bandwidth as the current serving BS fulfills requirements, reserve MAC layer information and other upper-layer information, and buffer current service flow data; a selecting module, adapted to scan and measure signal quality of neighboring BSs with a different bandwidth, and select several BSs compliant with signal quality requirements and suitable as target BSs to make up a target BS list; and a handover module, adapted to perform handover to a target BS in the target BS list.

The MS 43 may further include a second processing module, which is adapted to readjust the physical layer parameters after completion of scanning to recover communications with the current serving BS.

The handover module includes: a first message sending module, adapted to send a MOB_MSHO-REQ message to the current serving BS. The MOB_MSHO-REQ message carries a target BS list, or an SBC context and a REG context of the MS under the channel bandwidth after handover, or items which are different from those in the SBC-REQ message and REG-REQ message reported under the old bandwidth.

If the MOB_MSHO-REQ message carries the SBC context and the REG context of the MS under the channel bandwidth after handover, or carries any items different from those in the SBC-REQ message and REG-REQ message reported under the old bandwidth, the current serving BS may further include: a parsing module, adapted to parse the received MOB_MSHO-REQ message to obtain and store the SBC-REQ message and REG-REQ message carried in the MOB_MSHO-REQ message; and a second message sending module, adapted to send a HO-REQ message to the network-side gateway. The HO-REQ message carries the target BS list and an MS context. If the MS adds the result of scanning and measuring the target BSs in the target BS list to the MOB_M-SHO-REQ message and sends the message to the current serving BS of the MS, the HO-REQ message further carries the result of scanning and measuring the target BSs in the target BS list optionally. The MS context includes the service flow information, SBC context, REG context, and security context. Some of the relevant parameters in the SBC context and the REG context are the relevant parameters in the SBC-REQ and the REG-REQ carried in the MOB_MSHO-REQ message, namely, parameters in the SBC-REQ and the REG-REQ of the MS under the bandwidth after handover. The security context does not necessarily include an AK context.

The gateway includes a message distributing module, which is adapted to distribute the HO-REQ message to all target BSs in the target BS list after receiving the HO-REQ message. Alternatively, after receiving the HO-REQ message, the network-side gateway selects several target BSs in the target BS list according to the load conditions of each target BS, and uses them to make up a second target BS list. The network-side gateway adds the second target BS list to the HO-REQ message, and distributes the message to all target BSs in the second target BS list. Alternatively, after receiving the HO-REQ message, the network-side gateway selects several target BSs in the target BS list according to the load conditions of each target BS, and uses them to make up a second target BS list; and calculates a new AK context of the MS, adds the second target BS list and the new AK context to the HO-REQ message, and distributes the message to all target BSs in the second target BS list.

The target BS includes a responding module, which is adapted to return a HO-RSP message to the network-side gateway after receiving the HO-REQ message. The HO-RSP message carries a handover-allowed flag indicating whether the handover is allowed, which is determined by the target BS after the target BS manages the network re-access resources of the target BS. The HO-RSP message optionally carries a handover optimization indication. The handover optimization indication is determined by the target BS preliminarily according to the MS context in the HO-REQ message. It indicates the steps omissible when the MS is handed over to the target BS.

The gateway further includes a third message sending module, which is adapted to send a HO-RSP-ALL message to the current serving BS of the MS after receiving the HO-RSP message replied by each target BS. The HO-RSP-ALL message sent by the gateway to the current serving BS carries the HO-RSP message replied by all target BSs that respond successfully.

The current serving BS further includes a fourth message sending module, which is adapted to send an air interface message MOB_BSHO-RSP to the MS after receiving the HO-RSP-ALL message. The MOB_BSHO-RSP message carries the HO-RSP message replied by all target BSs that respond successfully in the HO-RSP-ALL message.

The handover module may further include a first handover subunit, which is adapted to select a target BS for handover from a target BS list in the MOB_BSHO-RSP message or from a second target BS list after receiving the MOB_BSHO-RSP message.

The first handover subunit may include: an indicating module, adapted to send a MOB_HO-IND message to the current serving BS of the MS, indicating the target BS for handover; and an adjusting subunit, adapted to adjust the physical layer parameters, and reserve the MAC layer information and other upper-layer information for handover to the channel bandwidth of the target BS so as to communicate with the target BS.

The current serving BS may further include a fifth message sending module, which is adapted to send a HO-Confirm message to the network-side gateway after receiving the MOB_HO-IND message. The HO-Confirm message carries an ID of the target BS and the MS context. The MS context includes the service flow information, SBC context, REG context, and security context. Some of the relevant parameters in the SBC context and the REG context are the relevant parameters in the SBC-REQ and the REG-REQ carried in the MOB_MSHO-REQ message, namely, parameters in the SBC-REQ and the REG-REQ of the MS under the bandwidth after handover. The security context does not necessarily include an AK context.

The gateway may further include a message forwarding module, which is adapted to forward the HO-Confirm message to the MS, indicating the target BS for handover.

The target BS may further include a communicating module, which is adapted to communicate with the MS according to the HO-Confirm message after receiving the HO-Confirm message.

The first handover subunit may further include a second handover subunit, which is adapted to communicate with the target BS to perform handover to the target BS.

If the MOB_MSHO-REQ message carries no SBC context or REG context of the MS under the channel bandwidth after handover, or carries no item different from those in the SBC-REQ message and REG-REQ message reported under the old bandwidth, the current serving BS may further include: a sixth message sending module, which is adapted to send a HO-REQ message to the network-side gateway after receiving the MOB_MSHO-REQ message. The HO-REQ message carries the target BS list, an MS context, and a physical layer parameter IE. The physical layer parameter IE indicates a bandwidth difference between the current serving BS of the MS and the target BS. The MS context includes the service flow information, SBC context, REG context, and security context. Some of the relevant parameters in the SBC context and the REG context are the relevant parameters in the SBC-REQ and the REG-REQ of the MS under the bandwidth before handover.

The gateway includes a message distributing module, which is adapted to distribute the HO-REQ message to all target BSs in the target BS list after receiving the HO-REQ message. Alternatively, after receiving the HO-REQ message, the network-side gateway selects several target BSs in the target BS list according to the load conditions of each target BS, and uses them to make up a second target BS list. The network-side gateway adds the second target BS list to the HO-REQ message, and distributes the message to all target BSs in the second target BS list. Alternatively, after receiving the HO-REQ message, the network-side gateway selects several target BSs in the target BS list according to the load conditions of each target BS, and uses them to make up a second target BS list; and calculates a new AK context of the MS, adds the second target BS list and the new AK context to the HO-REQ message, and distributes the message to all target BSs in the second target BS list.

The target BS includes a responding module, which is adapted to return a HO-RSP message to the network-side gateway after receiving the HO-REQ message. The HO-RSP message carries a handover-allowed flag indicating whether the handover is allowed, which is determined by the target BS after the target BS manages the network re-access resources of the target BS. The HO-RSP message optionally carries a handover optimization indication. The handover optimization indication is determined by the target BS preliminarily according to the MS context in the HO-REQ message. It indicates the steps omissible when the MS is handed over to the target BS. The handover optimization indication further includes an indication that the SBC context and the REG context are not omissible.

The gateway further includes a third message sending module, which is adapted to send a HO-RSP-ALL message to the current serving BS of the MS after receiving the HO-RSP message replied by each target BS. The HO-RSP-ALL message sent by the gateway to the current serving BS carries the HO-RSP message replied by all target BSs that respond successfully.

The current serving BS further includes a fourth message sending module, which is adapted to send an air interface message MOB_BSHO-RSP to the MS after receiving the HO-RSP-ALL message. The MOB_BSHO-RSP message carries the HO-RSP message replied by all target BSs that respond successfully in the HO-RSP-ALL message.

The handover module may further include a first handover subunit, which is adapted to select a target BS for handover from a target BS list in the MOB_BSHO-RSP message or from a second target BS list after receiving the MOB_BSHO-RSP message.

The first handover subunit may include: an indicating module, adapted to send a MOB_HO-IND message to the current serving BS of the MS, indicating the target BS for handover; and an adjusting subunit, adapted to: adjust the physical layer parameters, and reserve the MAC layer information and other upper-layer information for handover to the channel bandwidth of the target BS so as to communicate with the target BS.

The current serving BS may further include a fifth message sending module, which is adapted to send a HO-Confirm message to the network-side gateway after receiving the MOB_HO-IND message. The HO-Confirm message carries the target BS list, an MS context, and a physical layer parameter IE. The physical layer parameter IE indicates a bandwidth difference between the current serving BS of the MS and the target BS. The MS context includes the service flow information, SBC context, REG context, and security context. Some of the relevant parameters in the SBC context and the REG context are the relevant parameters in the SBC-REQ and the REG-REQ of the MS under the bandwidth before handover.

The gateway may further include a message forwarding module, which is adapted to forward the HO-Confirm message to the MS, indicating the target BS for handover.

The target BS may further include a communicating module, which is adapted to communicate with the MS according to the HO-Confirm message after receiving the HO-Confirm message.

The first handover subunit may further include a second handover subunit, which is adapted to communicate with the target BS to perform handover to the target BS.

The target BS may further include a first indicating module, which is adapted to instruct the MS to perform SBC negotiation and REG negotiation again in the process of communications with the MS.

The first handover subunit may further include a reporting module, which is adapted to report the SBC context and REG context of the MS under the bandwidth after handover, or items different from those in the SBC-REQ message and REG-REQ message reported under the old bandwidth according to the indication of the target BS.

After reading the foregoing embodiments, those skilled in the art are clearly aware that the embodiments of the present invention may be implemented through hardware, or, preferably in most circumstances, through software in addition to a necessary universal hardware platform. Therefore, the technical solution under the present invention or its novelty in contrast to the prior art may be embodied in a software product. The software product is stored in a computer-readable storage medium such as a computer floppy disk, a hard disk and a Compact Disk-Read Only Memory (CD-ROM), and incorporates several instructions for instructing a device to execute the method provided in any embodiment of the present invention.

Through the technical solution under the present invention, the MS is handed over between BSs with different bandwidths, with little or no time of service interruption.

The above descriptions are merely preferred embodiments of the present invention, but not intended to limit the scope of the present invention. Any modifications, variations or replacements that can be easily derived by those skilled in the art shall fall within the scope of the present invention. Therefore, the scope of the present invention is subject to the appended claims.

What is claimed is:

1. A method for mobile station handover, the method comprising: receiving information about neighboring base stations (BSs) from a current serving base station (BS) of a mobile station (MS); scanning the neighboring BSs according to the neighboring BS information received from the current serving BS; when no neighboring BS having the same bandwidth as the current serving BS fulfills requirements, scanning and measuring signal quality of neighboring BSs with a different bandwidth and selecting a plurality of BSs compliant with signal quality requirements and suitable as target BSs to make up a target BS list, wherein the scanning and measuring signal quality of the neighboring BSs comprises, by the MS: adjusting physical layer parameters for handover to a channel bandwidth of the scanned BSs within a scan interval; reserving Media Access Control (MAC) layer information and other upper-layer information; buffering current service flow data; and then scanning and measuring signal quality of the neighboring BSs with a different bandwidth: and then readjusting physical layer parameters to recover communications with the current serving BS after completion of scanning; then performing a handover to a target BS in the target BS list wherein performing the handover comprises: sending, by the MS, a first message to the current serving BS when the MS needs to be handed over, wherein the first message carries target BS list information; by the currently serving BS of the MS, parsing the first message after receiving the first message to obtain and store an SS Basic Capability Request (SBC-REQ) message and a Registration Request (REG-REQ) message carried in the first message, and sending a second message to a network-side gateway, wherein the second message carries the target BS list and an MS context; by the network-side gateway, distributing the second message to all target BSs in the target BS list after receiving the second message; or selecting several target BSs in the target BS list according to load conditions of each target BS after receiving the second message, using the selected target BSs to make up a second target BS list, adding the second target BS list to the second message, and distributing the second message to all target BSs in the second target BS list; or selecting several target BSs in the target BS list according to the load conditions of each target BS after receiving the second message, using the selected target BSs to make up a second target BS list, calculating a new Authorization Key (AK) context of the MS, adding the second target BS list and the new AK context to the second message, and distributing the second message to all target BSs in the second target BS list; replying, by the target BS that receives the second message, a third message to the network-side gateway, wherein the third message carries a handover-allowed flag; sending, by the network-side gateway, a fourth message to the current serving BS of the MS after receiving the third message replied by each target BS, wherein the fourth message sent by the gateway to the current serving BS carries the third message replied by all target BSs that respond successfully; sending, by the current serving BS of the MS, an air interface message to the MS after receiving the fourth message, wherein the air interface message carries the third message replied by all target BSs that respond successfully in the fourth message; and selecting, by the MS, a target BS for handover from the target BS list in the air interface message or from the second target BS list after receiving the air interface message.

2. The method according to claim 1, wherein: when relevant parameters in the SBC-REQ message and the REG-REQ message change, the first message further carries an SBC context and a REG context of the MS under a channel bandwidth after handover, or carries items that are different from those in the SBC-REQ message and REG-REQ message reported under an old bandwidth.

3. The method according to claim 1, wherein: if the MS adds a result of scanning and measuring the target BSs in the target BS list to the first message and sends the first message to the current serving BS of the MS, the second message further carries the result of scanning and measuring the target BSs in the target BS list.

4. The method according to claim 1, wherein performing the handover comprises: sending a first message from the MS to the current serving BS when the MS needs to be handed over, wherein the first message carries target BS list information; sending a second message from the currently serving BS of the MS to a network-side gateway after receiving the first message, wherein the second message carries the target BS list, an MS context, and a physical layer parameter Information Element (IE); by the network-side gateway, distributing the second message to all target BSs in the target BS list after receiving the second message; or selecting several target BSs in the target BS list according to load conditions of each target BS after receiving the second message, using the selected target BSs to make up a second target BS list, adding the second target BS list to the second message, and distributing the second message to all target BSs in the second target BS list; or selecting several target BSs in the target BS list according to the load conditions of each target BS after receiving the second message, using the selected target BSs to make up a second target BS list, calculating a new Authorization Key (AK) context of the MS, adding the second target BS list and the new AK context to the second message, and distributing the second message to all target BSs in the second target BS list ;replying, by the target BS that receives the second message, a third message to the network-side gateway, wherein the third message carries a handover-allowed flag; sending, by the network-side gateway, a fourth message to the current serving BS of the MS after receiving the third message replied by each target BS, wherein the fourth message sent by the gateway to the current serving BS carries the third message replied by all target BSs that respond successfully; sending, by the current serving BS of the MS, an air interface message to the MS after receiving the fourth message, wherein the air interface message carries the third message replied by all target BSs that respond successfully in the fourth message; and selecting, by the MS, a target BS for handover from the target BS list in the air interface message or from the second target BS list after receiving the air interface message.

5. The method according to claim 4, wherein: the third message further carries a handover optimization indication, which is determined by the target BS preliminarily according to the MS context in a HO-REQ message.

6. The method according to claim 4, wherein the MS selecting a target BS for handover from the target BS list in the air interface message or from the second target BS list after receiving the air interface message comprises: by the MS, sending a MOB_HO-IND message to the current serving BS of the MS to indicate the target BS for handover, adjusting physical layer parameters, and reserving Media Access Control (MAC) layer information and other upper-layer information for handover to a channel bandwidth of the target BS so as to communicate with the target BS; sending, by the current serving BS of the MS, a HO-Confirm message to the network-side gateway after receiving the MOB_HO-IND message, wherein the HO-Confirm message carries an identifier (ID) of the target BS, and the MS context or the physical layer parameter IE; forwarding, by the network-side gateway, the HO-Confirm message to the MS to indicate the target BS for handover; and communicating, by the target BS indicated by the MS, with the MS according to the HO-Confirm message after receiving the HO-Confirm message, whereupon the MS is handed over to the target BS.

7. The method according to claim 1, wherein the third message further carries a handover optimization indication, which is determined by the target BS preliminarily according to the MS context in a HO-REQ message.

8. The method according to claim 1, wherein MS selecting a target BS for handover from the target BS list in the air interface message or from the second target BS list after receiving the air interface message comprises: by the MS, sending a MOB_HO-IND message to the current serving BS of the MS to indicate the target BS for handover, adjusting physical layer parameters, and reserving Media Access Control (MAC) layer information and other upper-layer information for handover to a channel bandwidth of the target BS so as to communicate with the target BS; sending, by the current serving BS of the MS, a HO-Confirm message to the network-side gateway after receiving the MOB_HO-IND message, wherein the HO-Confirm message carries an identifier (ID) of the target BS, and the MS context or the physical layer parameter IE; forwarding, by the network-side gateway, the HO-Confirm message to the MS to indicate the target BS for handover; and communicating, by the target BS indicated by the MS, with the MS according to the HO-Confirm message after receiving the HO-Confirm message, whereupon the MS is handed over to the target BS.

9. The method according to claim 1, wherein receiving information about neighboring BSs comprises receiving information that was obtained by the current serving BS and broadcast from the current serving BS.

10. A communication system, comprising: a current serving base station (BS), adapted to obtain information about neighboring BSs, and broadcast the information about the neighboring BSs; and a mobile station (MS), adapted to: scan the neighboring BSs according to the neighboring BS information broadcast by the current serving BS ;when no neighboring BS having the same bandwidth as the current serving BS fulfills requirements, scan and measure signal quality of neighboring BSs with a different bandwidth, and select several BSs compliant with signal quality requirements and suitable as target BSs to make up a target BS list, wherein the MS is adapted to adjust physical layer parameters for handover to a channel bandwidth of the scanned BSs within a scan interval, reserve Media Access Control (MAC) layer information and other upper-layer information, buffer current service flow data, scan and measure signal quality of the neighboring BSs with a different bandwidth, and then readjust physical layer parameters to recover communications with the current serving BS after completion of scanning; and then perform handover to a target BS in the target BS list wherein the handover module comprises: a first message sending module, adapted to send a first message to the current serving BS, wherein the first message carries the target BS list, or an SBC context and a REG context of the MS under the channel bandwidth after handover, or items that are different from those in an SS Basic Capability Request (SBC-REQ) message and a Registration Request (REG-REQ) message reported under an old bandwidth; and a first handover subunit, adapted to select a target BS for handover from the target BS list in an air interface message or from a second target BS list after receiving the air interface message sent by the current serving BS.

11. A mobile station (MS), comprising: a scanning module, adapted to scan neighboring Base Stations (BSs) according to neighboring BS information broadcast by a current serving BS; a first processing module, adapted to adjust physical layer parameters for handover to a channel bandwidth of the scanned BSs within a scan interval when no neighboring BS having the same bandwidth as the current serving BS fulfills requirements, to reserve Media Access Control (MAC) layer information and other upper-layer information, and to buffer current service flow data; a selecting module, adapted to scan and measure signal quality of neighboring BSs with a different bandwidth, and to select several BSs compliant with signal quality requirements and suitable as target BSs to make up a target BS list; a second processing module, adapted to readjust the physical layer parameters to recover communications with the current serving BS after completion of scanning; and a handover module, adapted to perform handover to a target BS in the target BS list wherein the handover module comprises: a first message sending module, adapted to send a first message to the current serving BS, wherein the first message carries the target BS list, or an SBC context and a REG context of the MS under the channel bandwidth after handover, or items that are different from those in an SS Basic Capability Request (SBC-REQ) message and a Registration Request (REG-REQ) message reported under an old bandwidth; and a first handover subunit, adapted to select a target BS for handover from the target BS list in an air interface message or from a second target BS list after receiving the air interface message sent by the current serving BS.

12. The MS according to claim 11, wherein the first handover subunit comprises:
an indicating module, adapted to send a MOB_HO-IND message to the current serving BS of the MS to indicate the target BS for handover; an adjusting subunit, adapted to adjust the physical layer parameters and to reserve the MAC layer information and other upper-layer information for handover to the channel bandwidth of the target BS so as to communicate with the target BS; and
a second handover subunit, adapted to communicate with the target BS to perform handover to the target BS.

13. The MS according to claim 11, wherein: the first handover subunit further comprises a reporting module, which is adapted to report the SBC context and REG context of the MS under the bandwidth after handover, or the items which are different from those in the SBC-REQ message and REG-REQ message reported under the old bandwidth according to the indication of the target BS.

* * * * *